March 18, 1958 E. R. ALTSCHUL 2,827,568

TRANSISTOR MULTIVIBRATOR

Filed Feb. 28, 1955

INVENTOR.

ERNEST R. ALTSCHUL

BY

ATTORNEYS

United States Patent Office 2,827,568

Patented Mar. 18, 1958

2,827,568

TRANSISTOR MULTIVIBRATOR

Ernst R. Altschul, New York, N. Y., assignor, by mesne assignments, to the United States of America as represented by the Secretary of the Navy Application February 28, 1955, Serial No. 491,237

2 Claims. (Cl. 250—36)

This invention relates to a relaxation oscillator or more particularly to a free-running multivibrator utilizing transistors.

The transistor is a three electrode semi-conductor which has been developed just recently for application in amplifying or oscillating circuits. Its advantages are well known in the art and include such features as small size, no heater power, rugged and capable of long life. Their use in electronic circuits yields results which are markedly superior, in certain applications, to vacuum tubes in similar situations.

It accordingly is an object of this invention to provide a novel multivibrator circuit.

A further object of this invention is to provide a multivibrator circuit which includes two transistors.

A still further object of this invention is to provide a multivibrator circuit which includes a pair of transistors in series across a D. C. potential.

Other objects and many of the attendant advantages of this invention will be readily appreciated as the same becomes better understood by reference to the following detailed description when considered in connection with the accompanying drawings wherein.

Figure 1:
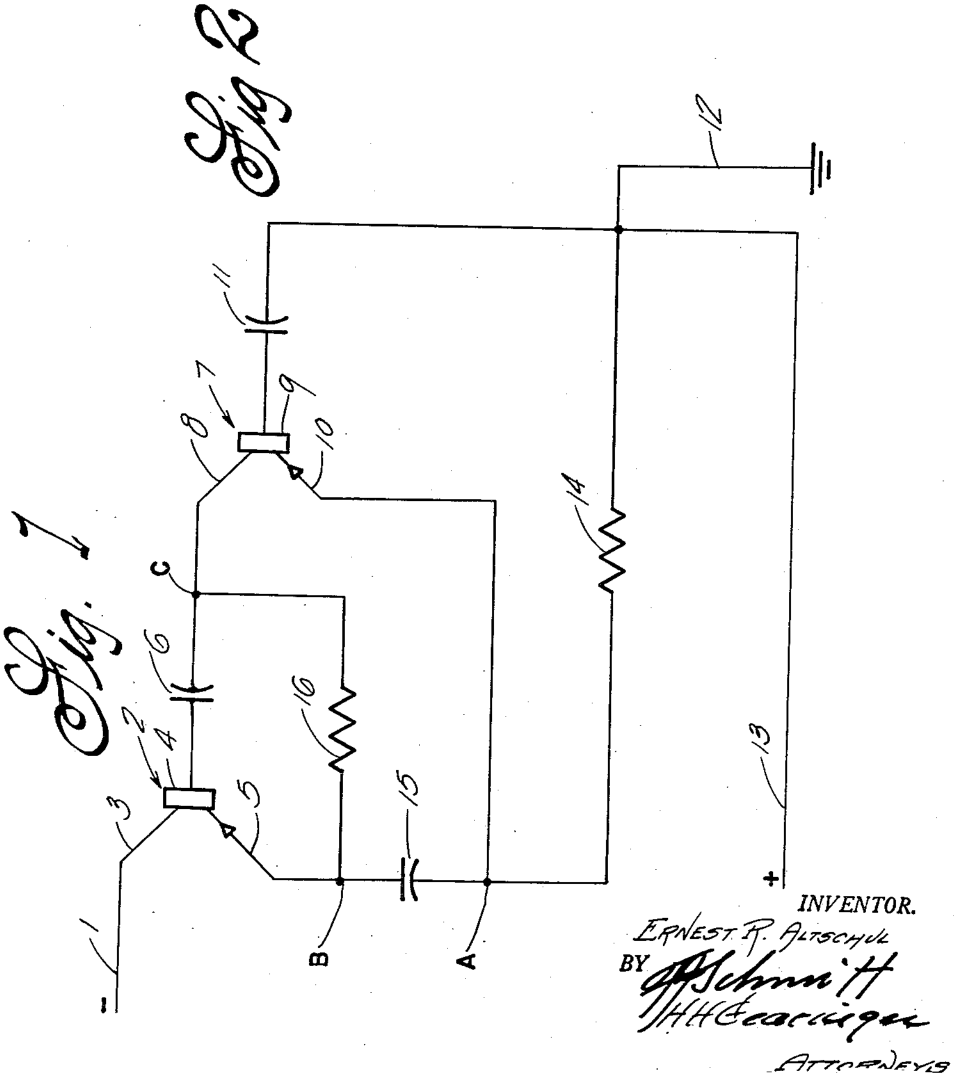
Figure 1 is a schematic diagram of a circuit embodying the invention.

Referring now to Figure 1 the invention takes the form of a circuit comprising a transistor 2 connected by a lead 1 to a negative source of potential. The transistor 2 has a collector 3, base 4 and emitter 5. The collector 3 is connected to the lead 1 while the base 4 is coupled through the capacitor 6 to the collector 8 of the transistor 7. The transistor 7 in addition to the collector 8 has a base 9 and emitter 10. Base 9 is coupled to the ground connection 12 through the capacitor 11. A suitable means 13 couples the circuit to a positive source of potential.

A resistor 14 is coupled between the emitter 10 of the transistor 7 and its base 9 at the point A on the grounded side of the capacitor 11. Coupled between the emitters 5 and 10 is the capacitor 15. The resistor 16 is coupled at points B and C between the emitter 5 and base 4 of the transistor 2.

In the operation of the device assume transistor 2 is conducting while transistor 7 is cut off or non-conducting. Current flows through resistor 14 and transistor 2 charging capacitor 15 toward the applied battery voltage. This is illustrated by reference to Figures 2A and 2B wherein the voltage in relation to time is shown for the points A and B respectively. The voltage drop across resistor 14 keeps transistor 7 in the non-conducting state. As the charge on the capacitor 15 reaches a maximum value, the charging current drops off along with the drop across 14.

The drop across 14 diminishes to the point where it cannot keep transistor 7 turned off and it begins to conduct. The conduction of transistor 7 involves a current through the resistor 16 and the resulting drop reduces the current in the transistor 2. Consequently, drop across resistor 14 is further decreased and transistor 7 conducts heavier. The current and drop across resistor 16 increases, driving transistor 2 to cut-off.

Transistor 7 is now conducting full and capacitor 15 discharges through it and resistor 16. When capacitor 15 has discharged sufficiently the current through resistor 16 does not produce enough drop to keep transistor 2 cut-off. This latter transistor begins to conduct and this current produces a voltage drop across resistor 14 which begins to turn transistor 7 off. The cycle now repeats itself in the manner previously described.

The purpose of the capacitors 6 and 11 is to prevent base current in the transistors. Such a current would reduce the voltage to which capacitor 15 will charge and since the base current in transistors is affected by heat and time, it would affect the frequency and amplitude.

Figure 2:
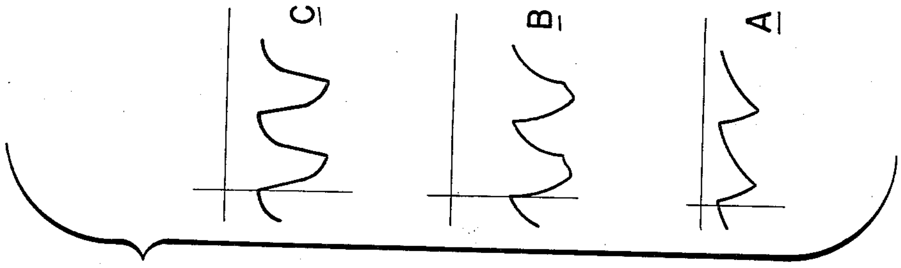
Figures 2A–2C is a graph of voltage against time at strategic points in the circuit.

The operation of the multivibrator will be better understood by reference to Figures 2A–2C. Figures 2A, B and C represent graphs of voltage against time as the junctions A, B and C respectively in Figure 1. The output may be taken from these points as desired.

While it is to be understood that the circuit specifications for the free running multivibrator may vary according to the design for any particular application, the following specifications are included by way of example for an output pulse frequency of approximately 1000 C. P. S.

| | | |
|---|---|---|
| Resistors 14 and 16 | kilo-ohms | 200 |
| Capacitor 15 | micromicrofarads | 2700 |
| Capacitors 6 and 11 | do | 1000 |

There has been disclosed a free-running multivibrator using transistors. It has application in radar and computor circuitry and elsewhere as a sawtooth wave generator.

The type of transistor contemplated in the circuit described above is P–N–P junction type. Such transistors conduct when a negative voltage is applied to the collector and a positive voltage is applied to the emitter, the reference electrode being the base. An N–P–N type junction transistor will operate similarly in the same circuit if the polarity of the supply voltage is reversed.

Obviously, many modifications and variations of the present invention are possible in the light of the above teachings. It is therefore to be understood that within the scope of the appended claims the invention may be practiced otherwise than as specifically described.

What is claimed is:

1. A free running multivibrator circuit comprising, a source of negative potential and a source of positive potential, a pair of transistors, the collector of the first transistor being coupled to the negative source, the collector of the second transistor being coupled to base of the first transistor, frequency determining means comprising a capacitor connected between the emitter of the first transistor and the emitter of the second transistor and resistors in the capacitor's charge and discharge path.

2. A free running multivibrator circuit comprising, sources of negative and positive potential, a first transistor, the collector of the first transistor being connected to said negative source, a second transistor, the collector of said second transistor being capacitively coupled to the base of said first transistcr, the base of said second resistor being capacitively coupled to ground and to said positive source, first resistive means coupling the emitter of said first transistor to said collector of said second transistor, second resistive means coupling the emitter of said second transistor to ground, and a capacitor connected between the emitters of said first and second transistors.

(References on following page)

References Cited in the file of this patent

UNITED STATES PATENTS

| | | |
|---|---|---|
| 2,417,286 | Bartels | Mar. 11, 1947 |
| 2,718,594 | White | Sept. 20, 1955 |

OTHER REFERENCES

"The Application of Transistors to Military Electronics Equipment," article, "Use of Transistors in Radiac Instruments," by Smyth, pages 452–454 and Fig. 7, September 1953.